(No Model.)  2 Sheets—Sheet 1.
J. L. SHIRING.
WATER FILTER.
No. 594,182. Patented Nov. 23, 1897.
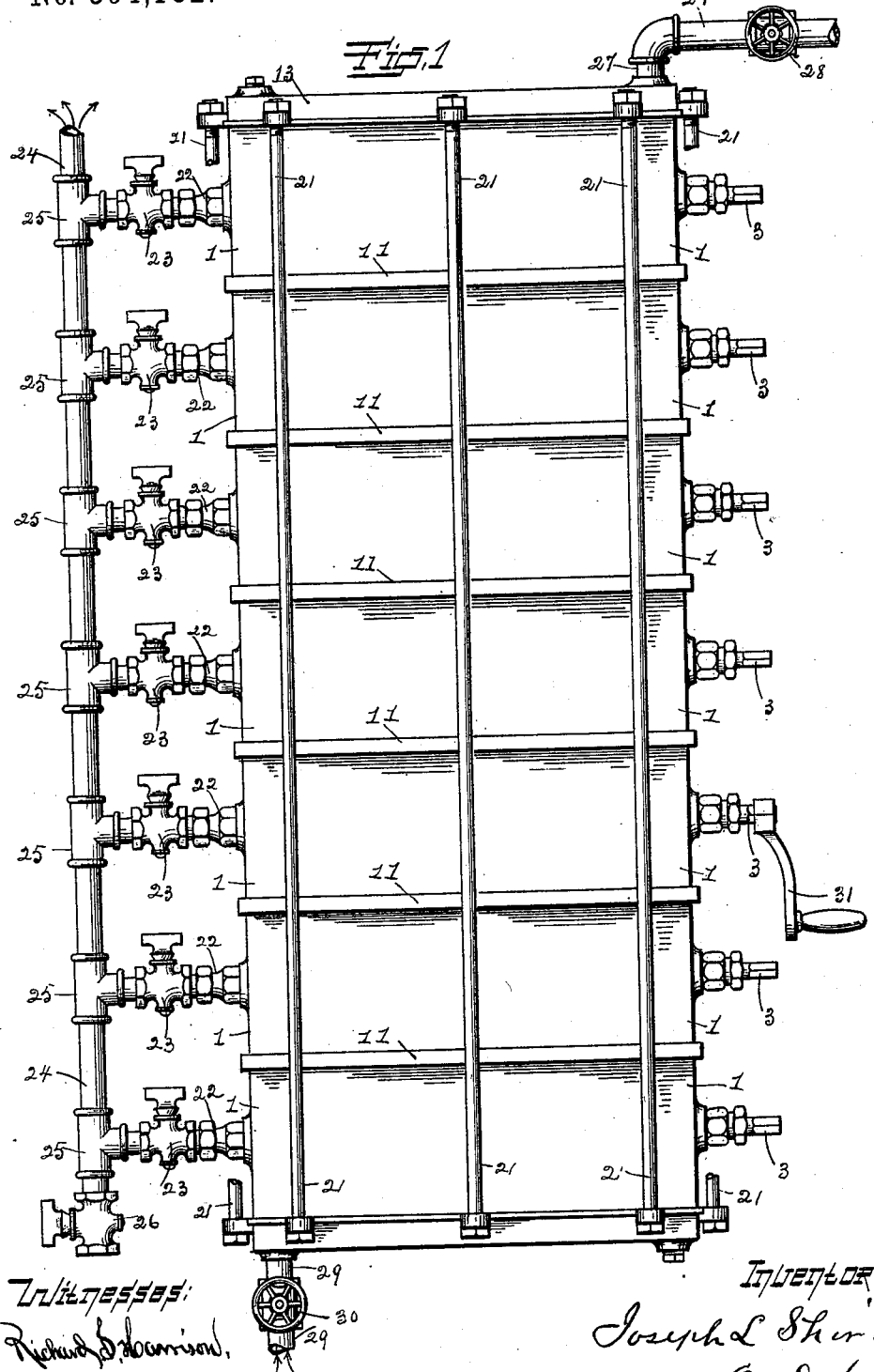
Witnesses:
Richard D. Morrison
Alex Wilson
Inventor
Joseph L. Shiring
by O. D. Levis
Atty

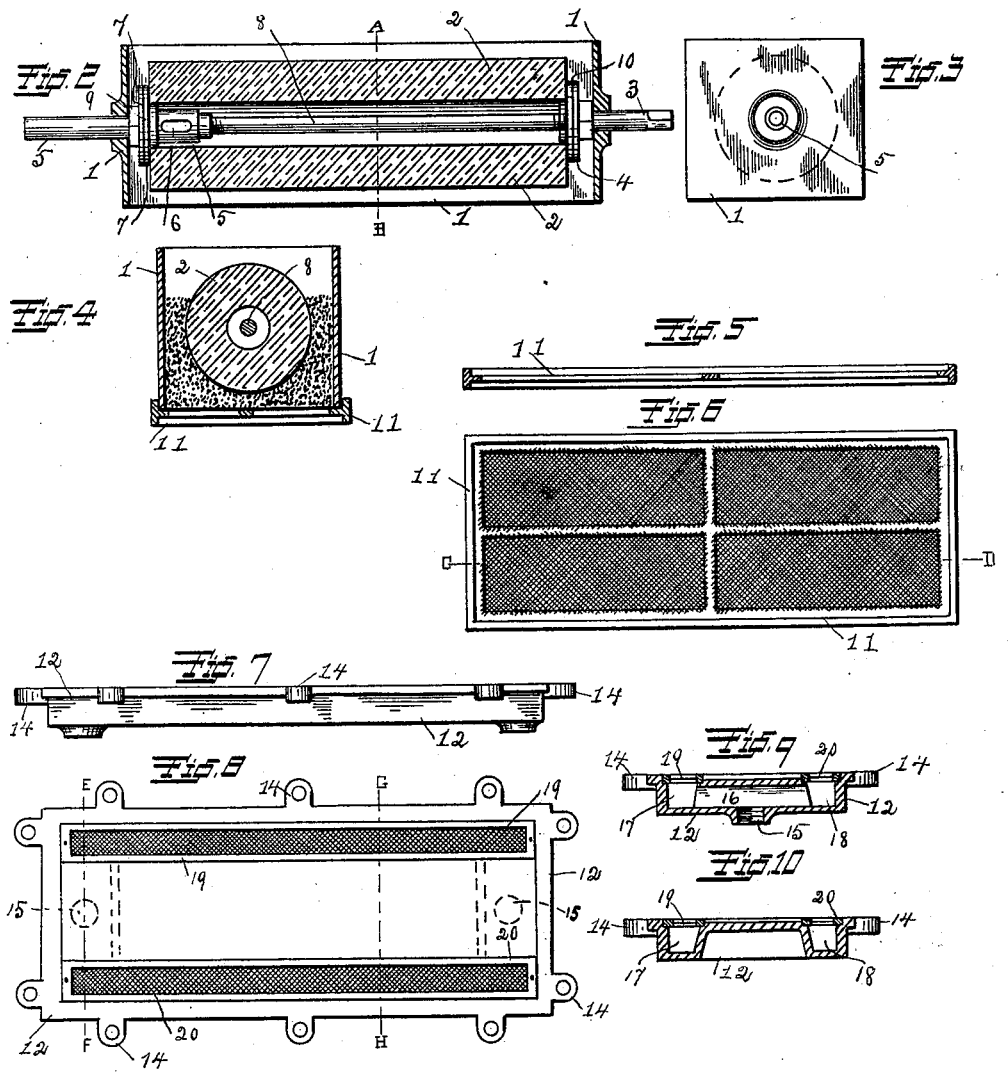

UNITED STATES PATENT OFFICE.

JOSEPH L. SHIRING, OF ALLEGHENY, PENNSYLVANIA.

WATER-FILTER.

SPECIFICATION forming part of Letters Patent No. 594,182, dated November 23, 1897.

Application filed August 21, 1896. Serial No. 603,484. (No model.)

*To all whom it may concern:*

Be it known that I, JOSEPH L. SHIRING, a citizen of the United States, residing at Allegheny, in the county of Allegheny and State of Pennsylvania, have invented certain new and useful Improvements in Water-Filters; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to certain new and useful improvements in water-filters.

The invention relates more particularly to that class of water-filters in which a tubular porous filtering-body is used, such as stone or composition, through which the water is required to pass. In this class of filters the periphery of the said body becomes rapidly coated with the impurities of the water, and these impurities must be forcibly removed, to accomplish which scrapers, brushes, and pebbles held stationary in compartments, &c., have been used, but owing to the softness of the filtering-body these cleaning devices wear away the said body very rapidly. The wearing away of the filtering-body and the cleaning devices after a time result in defective cleaning until the filter becomes inoperative.

In filters of the above-described class, wherein the filtering-body is placed in a vertical position and surrounded with a granular body of sand or crushed quartz, it has been found that after the filter has been in use for a short time and the porous cylinder has been revolved a number of times for cleaning, and the granular bed being more compact at the base, the result is that the filtering-body becomes much more worn away at the lower end or base than at any other portion, thus rendering the cylindric porous body useless within a short time.

The object of my invention is to provide a water-filter in which the filtering-body is placed in a horizontal position and surrounded with a granular bed of quartz or other suitable material and is so arranged that when the filtering-body is revolved against the granular bed the wear upon the said body is distributed throughout the entire length.

Another object of my invention is to so construct the filter that a number of them may be placed together, one upon the other, according to the number of rooms to be supplied.

Another object of my invention is to provide a simple and practical filter that will be of few parts, neat in appearance, and comparatively inexpensive to manufacture.

With the above objects in view the invention finally consists in the novel construction, combination, and arrangement of parts to be hereinafter more specifically described.

In describing the invention in detail reference is had to the accompanying drawings, forming a part of this specification, and wherein like figures of reference indicate similar parts throughout the several views, in which—

Figure 1 is a side view of a series of my improved filters placed one upon the other and secured together and coupled to the supply-pipe. Fig. 2 is a horizontal sectional view through the filtering body and frame. Fig. 3 is an end view of the filter-frame containing the filtering-body. Fig. 4 is a sectional view through the filtering body and frame on the line A B. Fig. 5 is a horizontal sectional view through the screen-frame on the line C D. Fig. 6 is a plan view of the same. Fig. 7 is a horizontal side view of the bottom and top plate. Fig. 8 is a plan view of the same. Fig. 9 is an end sectional view through the said plate on the line E F. Fig. 10 is an end sectional view through the same on the line G H.

In the sectional view shown at Figs. 3 and 4 the filter box or frame is designated as 1, and the filtering-body 2, which is formed of a hollow cylinder of porous stone or other substitute projecting through a bearing which is formed within the end of the filter frame or box, and fitted to the end of the cylinder is the stem 3, which is provided with a collar 4. Fitted within the opposite end of the cylinder is the hollow shaft 5, one end of which projects into the interior portion of the cylinder and is provided with the openings 6 and collar 7. The opposite end of the said shaft extends out through a bearing formed within that end of the filter box or frame. Within the cylinder is the connecting-rod 8, which connects the two bearings together. Between the collars and the ends of the porous cylinder are arranged the gaskets or washers 9 and 10 to prevent leakage.

In Figs. 4, 5, and 6 is shown the screen-plate 11, which is adapted to fit between the filter-boxes, as shown at Fig. 1.

The base-plate 12 (shown at Figs. 7, 8, 9, and 10) and the top plate 13 (shown at Fig. 1) are similar in construction and consist of a plate provided with the lugs 14 and the opening 15, which leads into the ports 16, connecting the waterways 17 and 18 together. A similar port is formed at the opposite end of the plate connecting the waterways together. Secured to the said plates and over the waterways are the screens 19 and 20.

The filter boxes or frames containing the filtering-body are placed one above the other, as shown at Fig. 1, and filled with granular quartz, as shown at Fig. 4, and with the screen-plates 11 placed between and the top and bottom plates placed in position and securely bolted together by the bolts 21. The ends of the hollow shafts are then loosely coupled up to the fittings 22, which are connected to the stop-cocks 23. The said stop-cocks are then connected to the pipe 24 by the couplings 25. A stop-cock 26 is connected to the bottom of the pipe for the purpose of draining if necessary. Connected to the top plate 13 is the pipe 27, which leads to the sewer or drain and is provided with the valve 28. The supply-pipe 29, which connects to the base-plate 12, is provided with the valve 30.

The operation of the filter is as follows: The cocks 23 are opened or closed, according to the number of rooms to be supplied, and the valve 28 being closed the valve 30 is opened to admit the water, which is forced through the parts and waterways up through the screens in the base-plate, through the granular beds and screen-plates, and through the filtering-bodies out through the openings 6 of the hollow shafts, through the said shafts and stop-cocks, and into the pipe 24 and to the point to be supplied. When the cylinders become coated with the impurities from the water, the crank 31 is applied to the stem 3 and the cylinders revolved against the granular beds, which operation removes the impurities, and if desired to flush the filters to remove the impurties from the granular beds the cocks are all closed and the valve 28 at the top is opened. The water being admitted by turning the valve 30 rushes through the granular beds, agitating them and causing the impurities to rise to the top and be forced out of the pipe 27 into the sewer or drain.

Having thus fully shown and described my invention, what I claim as new, and desire to secure by Letters Patent, is—

1. A water-filter comprising filtering boxes or casings having porous bodies journaled therein and mounted on a shaft, granular beds of loose material surrounding the said porous bodies, screens between said granular beds, suitable means for revolving the filtering-bodies, and means for flushing the said porous bodies comprising the valves 28 and 30, substantially as set forth.

2. A water-filter comprising filter boxes or casings, hollow cylindrical porous bodies journaled in said boxes or casings, and mounted on a hollow shaft, said shaft having an opening at one end which communicates with the interior or the filtering-body, granular beds of loose material surrounding said filtering-bodies, screen-plates arranged between said granular beds, a top and bottom plate provided with waterways and screens, means for revolving the filtering-bodies comprising a crank 31 adapted to fit on the end of the said hollow shaft, and means for flushing the said cylinders comprising the valves 28 and 30 located at the top and bottom of said boxes or casings, substantially as set forth.

In testimony whereof I affix my signature in presence of two witnesses.

JOSEPH L. SHIRING.

Witnesses:
ALBERT J. WALKER,
RICHARD S. HARRISON.